United States Patent [19]
Weber

[11] Patent Number: 5,796,248
[45] Date of Patent: *Aug. 18, 1998

[54] METHOD AND APPARATUS FOR COMMUTATING A THREE-PHASE VARIABLE RELUCTANCE MOTOR

[75] Inventor: Charles Francis Weber, South Lyon, Mich.

[73] Assignee: Ford Motor Company, Dearborn, Mich.

[*] Notice: The term of this patent shall not extend beyond the expiration date of Pat. No. 5,642,044.

[21] Appl. No.: 611,898

[22] Filed: Mar. 6, 1996

Related U.S. Application Data

[63] Continuation-in-part of Ser. No. 523,316, Sep. 5, 1995, Pat. No. 5,642,044, which is a continuation-in-part of Ser. No. 308,790, Sep. 19, 1994, Pat. No. 5,489,845.

[51] Int. Cl.$^6$ .............................. G01B 7/14; G05B 19/40
[52] U.S. Cl. ..................... 324/207.16; 318/685; 318/696
[58] Field of Search ........................... 324/207.25, 166, 324/173, 174, 207.11, 207.15, 207.16, 207.22; 318/766, 603, 802, 434, 685, 696, 439; 303/100, 115.2

[56] References Cited

U.S. PATENT DOCUMENTS

| | | | |
|---|---|---|---|
| 3,778,691 | 12/1973 | Poppinger et al. | 318/254 |
| 4,277,735 | 7/1981 | Okuyama et al. | 318/766 |
| 4,461,994 | 7/1984 | MacDonald | 324/174 |
| 4,712,186 | 12/1987 | Fromme | 364/565 |
| 4,991,301 | 2/1991 | Hore | 33/366 |
| 5,107,213 | 4/1992 | Ponticelli et al. | 324/207.25 |
| 5,194,794 | 3/1993 | Shamoto | 318/603 |
| 5,320,421 | 6/1994 | Kade et al. | 303/100 |
| 5,444,341 | 8/1995 | Kneifel, II et al. | 318/432 |

*Primary Examiner*—Walter E. Snow
*Attorney, Agent, or Firm*—Peter Abolins; Roger L. May

[57] ABSTRACT

A method and apparatus for exciting a three-phase variable reluctance motor is used, for example, as an encoder system to commutate a rotor. The system includes a power source, a position sensor and excitation electronics. The position sensor is adapted to generate a plurality of variable induction values corresponding to relative motor torque rankings and absolute angular positions of the rotor. Excitation electronics is provided electric communication with the inductive sensor and the power source and is adapted to generate digital values of the inductance values corresponding to the motor torque rankings. Excitation electronics includes steering logic responsive to the digital values to generate an output signal having a value corresponding to the phase of the motor to apply current to so as to commutate the rotor.

15 Claims, 13 Drawing Sheets

METHOD AND APPARATUS FOR COMMUTATING A THREE-PHASE VARIABLE RELUCTANCE MOTOR

CROSS-REFERENCE TO RELATED APPLICATION

This application is a continuation-in-part of patent application Ser. No. 08/523,316, filed Sep. 5, 1995, entitled "Method And Apparatus For Exciting A Three-Phase Variable Reluctance Position Sensor", now U.S. Pat. No. 5,642,044 which is a continuation-in-part of patent application Ser. No. 08/308,790, filed Sep. 19, 1994, now U.S. Pat. No. 5,489,845, issued Feb. 6, 1996, entitled "Encoder System And Method For Determining Absolute Rotor Position", which have at all times relevant hereto been commonly owned, and the details of which are hereby incorporated by reference.

TECHNICAL FIELD

This invention relates to a method and apparatus for exciting a three-phase Variable Reluctance (VR) Motor using a three-phase Variable Reluctance position sensor.

BACKGROUND ART

A three-phase Variable Reluctance (VR) motor is a stepper motor controlled by three coils. The motor includes a rotor which inherently seeks a favored or stable detent position when current is flowing. In operation, the motor will resist movement until it reaches the zero torque unstable position, whereupon it will flip to the next stable detent position. By applying current to the coils at appropriate times, however, the commutation of the motor may be controlled and the motor may be prevented from reaching one or more of its natural detent positions. To date, electric motor designers have been challenged to develop systems and methods to economically and efficiently perform this task.

While it is known that efficient operation of a three-phase Variable Reluctance motor may be achieved under these conditions, electric motor designers have heretofore had difficulty in designing motors to operate accordingly.

Consequently, a need has developed for a system and method for obtaining and utilizing motor shaft (rotor) position information and corresponding motor torque rankings to efficiently commute a three-phase Variable Reluctance motor. Such a system and method should be particularly suited for use with a typical three-phase Variable Reluctance motor and should not require the use of substantially additional hardware or contacting elements which will add additional expense or wear out.

DISCLOSURE OF THE INVENTION

It is an object of the present invention to provide a system and method for exciting a three-phase Variable Reluctance (VR) motor.

Still further, it is an object of the present invention to provide an encoder system for commutating a three-phase Variable Reluctance (VR) motor in accordance with variable inductance values which are generated and correspond to relative motor torque rankings at absolute angular positions of the rotor.

In accordance with the above-stated objects and other objects, features and advantages of the present invention, there is provided such an encoder system which is specifically directed for use with a three-phase Variable Reluctance (VR) motor. The system includes an inductance sensor adapted to generate a plurality of variable inductance values which correspond to relative motor torque rankings at absolute angular positions of the rotor of the three-phase VR motor. These values may be plotted as phase-separated pseudo-sinusoidal waveforms. The resultant inductance/position profile corresponds to motor torque rankings at predetermined zones. The profile has near-linear, i.e., sawtooth-like regions with determinable slopes and offsets. Excitation electronics having an inductance to digital converter and steering logic are used to power the variable reluctance motor. The inductance to digital converter is in electrical communication with the inductance sensor and a power source for generating digital values of the inductance values which correspond to the motor torque rankings. The steering logic responds to the digital values to generate an output signal having a value corresponding to which coil (phase) of the motor to apply current to so as to commutate the motor.

In a preferred embodiment, the inductance sensor of the encoder system comprises a stationary arrangement of stationary coils which form a stator and a magnetic salient pole rotating structure which forms a rotor and is free to turn inside or outside of the stator. The rotor has eight salient poles. Also in the preferred embodiment, the stator poles are arranged in three-phased windings distributed in the above-referenced six windings with two coils connected in series in each phase so as to generate three-phase separated variable inductance values for each rotor position.

Still further, in the preferred embodiment, the inductance to digital converter comprises a corresponding plurality of powered encoder coils as well as a plurality of switches. Each of the switches are provided in electrical communication with one another and a corresponding encoder coil. A plurality of current sensors is similarly provided, each of which is in electrical communication with a corresponding switch and is further adapted to convert current to voltage.

Still further, a free-running oscillator/clock is provided. A plurality of comparators are also provided, each of which has a first input from a corresponding current sensor and second input from a dynamic reference voltage source, and an output. Each of the comparators is provided as an input to steering logic, the output of which is provided to a plurality of latches which are in electrical communication with one another and the reference voltage source. The latches provide inputs to the motor coil power amplifier and an optional microcomputer. In operation, each latch one at a time stores a logic "1". The input to the first latch causing it to store a logic 1 turns off the switches, and current begins decaying in the associated encoder coils. Simultaneously, the reference threshold is changed to a new value.

Also in accordance with the present invention, a method for commutating a three-phase Variable Reluctance (VR) motor is disclosed. The method includes the steps of generating at an inductance sensor, a plurality of variable inductance values corresponding to the motor torque rankings at absolute angular positions of the rotor. Thereafter, digital values are generated from the inductance values which correspond to the motor torque rankings. Finally, steering logic is applied to the digital values so as to generate a new output signal for receipt by the motor. The output signal contains a value corresponding to which phase (coil) the motor current must be applied to so as to commutate the motor.

These and other objects, features and advantages of the present invention are readily apparent from the following detailed description of the best mode for carrying out the invention when taken in connection with the accompanying drawings wherein like reference numerals correspond to like components.

BEST MODES FOR CARRYING OUT THE INVENTION

Figure 1:
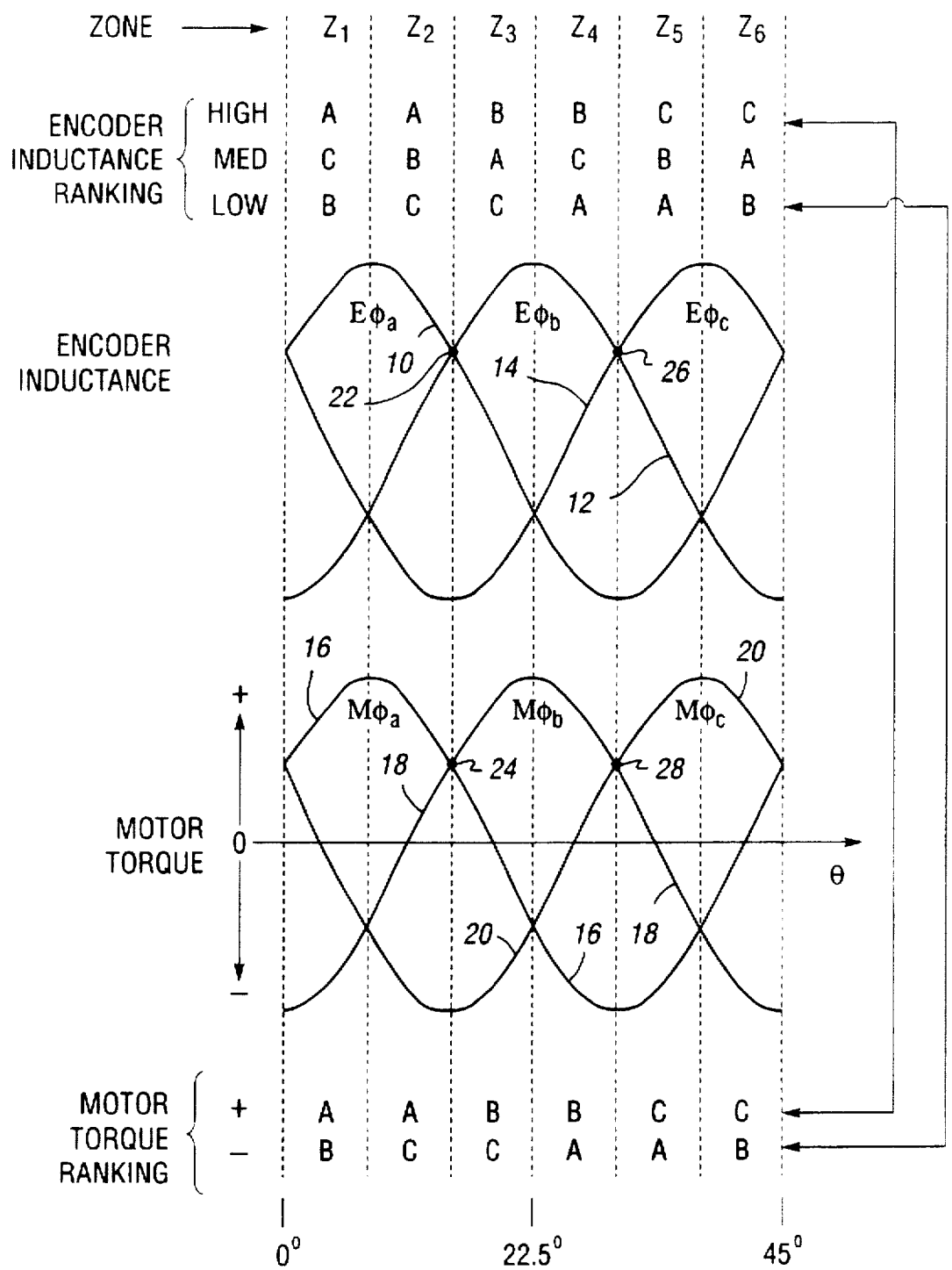
FIG. 1 is a schematic diagram illustrating the motor torque profile for a typical three-phase VR motor for a first type alignment of the encoder with the coils of the motor.
Figure 2:
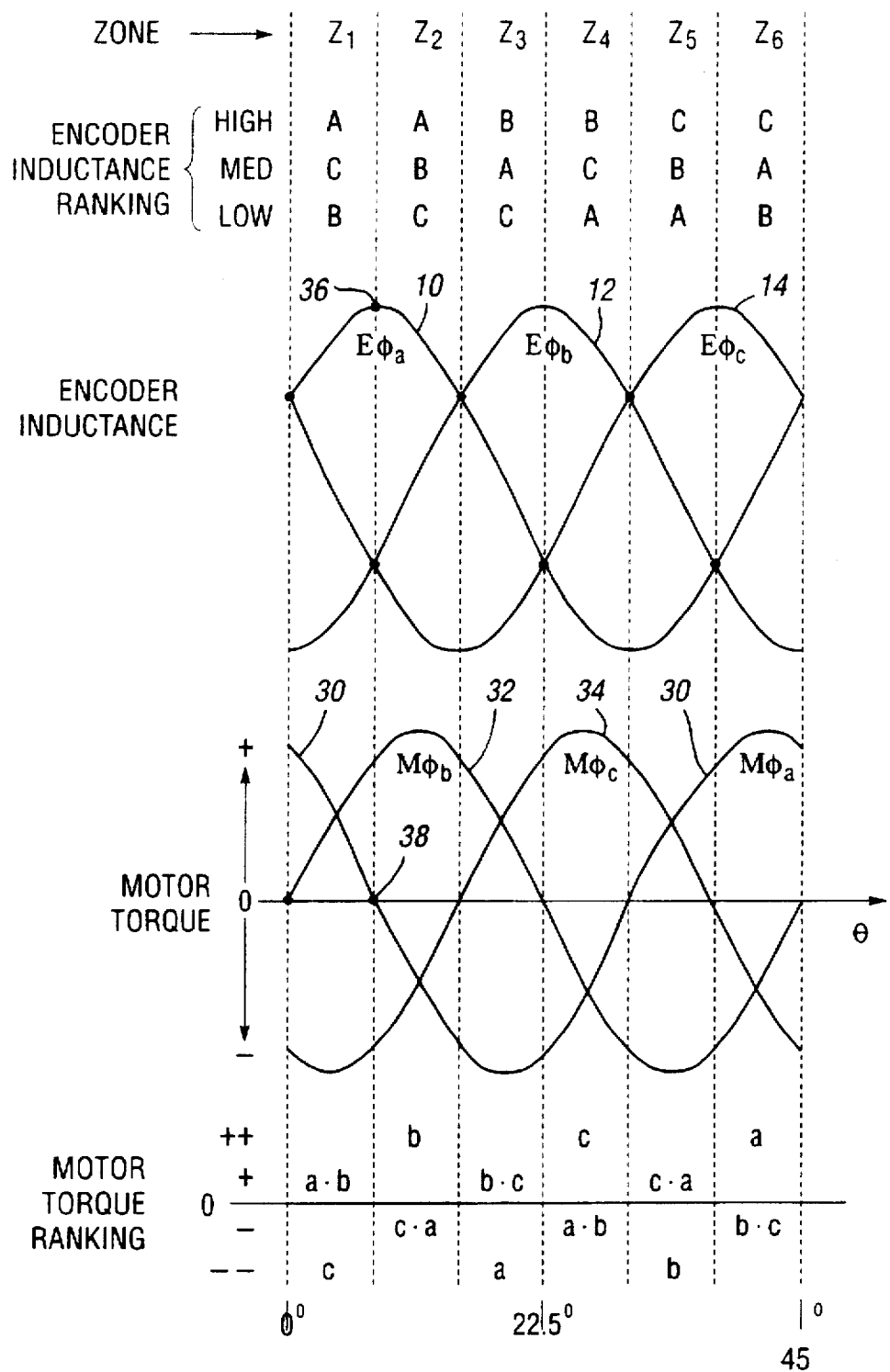
FIG. 2 is a schematic diagram illustrating the motor torque profile for a typical three-phrase VR motor for a second type alignment with the coils of the motor.
Figure 3:
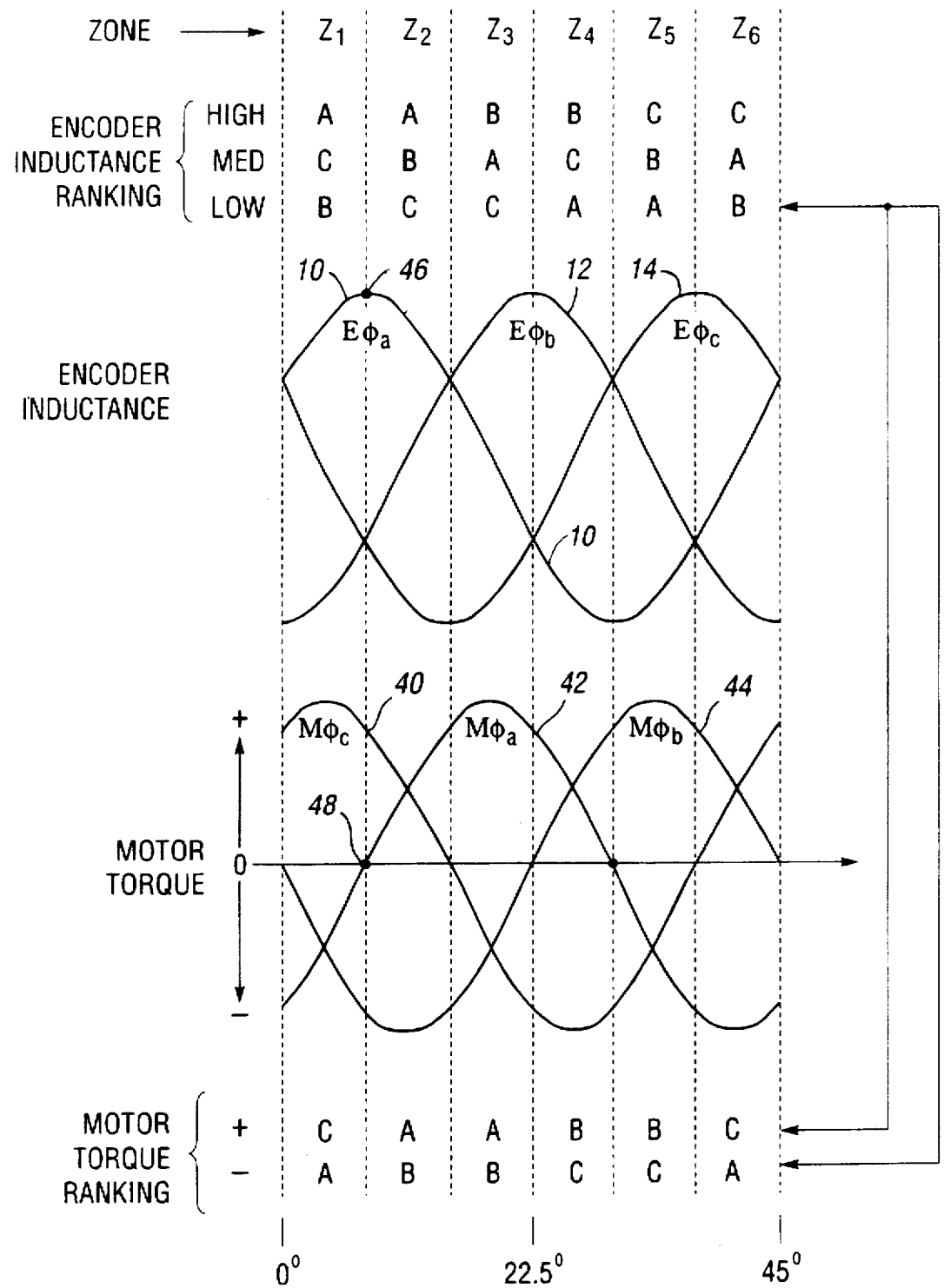
FIG. 3 is a schematic diagram illustrating the motor torque profile for a typical three-phase VR motor for a third type alignment of the encoder with the coils of the motor.

Prior to the discussion of the preferred embodiment of the system of the present invention, it is advantageous to discuss various types of alignment between the coils of the encoder with the windings or phases of the motor and the various types of commutation. Turning first to the types of alignments between the encoder and phases of motor, three different types of alignment are shown in FIGS. 1, 2 and 3. Alignment Type I is shown in FIG. 1 in which the encoder phases are aligned with the motor phases.

Referring to FIG. 1, the inductance values of the three phases of the encoder $E\phi_a$, $E\phi_b$ and $E\phi_c$, are shown as curves 10, 12 and 14, respectively. The curves 10, 12 and 14 are shown for 360° electrical degrees which correspond to a 45° mechanical rotation of the motor's rotor. In a like manner, the three phases of the motor torque $M\phi_a$, $M\phi_b$ and $M\phi_c$ are illustrated by the curves 16, 18 and 20. The crossover point 22 between $E\phi_a$ and $E\phi_b$ is aligned with the crossover point 24 between $M\phi_a$ and $M\phi_b$. In a like manner, the crossover point 26 between $E\phi_b$ and $E\phi_c$, is aligned with the crossover point 28 between $M\phi_b$ and $M\phi_c$.

In a Type II alignment shown in FIG. 2, the inductances of the encoder $E\phi_a$, $E\phi_b$ and $E\phi_c$ are again illustrated by curves 10, 12 and 14 and the motor output torques $M\phi_a$, $M\phi_b$ and $M\phi_c$ are illustrated by curves 30, 32 and 34. In this alignment configuration, the inductance of each phase of the encoder $E\phi_a$, $E\phi_b$ and $E\phi_c$, is a maximum when the corresponding motor torque is 0. As shown in FIG. 2, when $E\phi_a$ curve 10 is a maximum point 36, the motor torque $M\phi_a$ curve 30 has a zero value as indicated by point 38 when the motor torque $M\phi_a$ is going from a positive value to a negative value.

The Type III alignment is shown in FIG. 3. Curves 10, 12 and 14 again represent the inductances of the encoder phase $E\phi_a$, $E\phi_b$ and $E\phi_c$, respectively, and the curves 40, 42 and 44 represent the motor torques $M\phi_a$, $M\phi_b$ and $M\phi_c$, respectively. In this alignment, the motor torque is zero when going from a negative value to a positive value and the corresponding encoder inductance is a maximum. For example, curve 40 motor torque, $M\phi_a$, is zero, point 48 when curve 10, encoder phase $E\phi_a$, is a maximum as illustrated as point 46.

Figure 4:
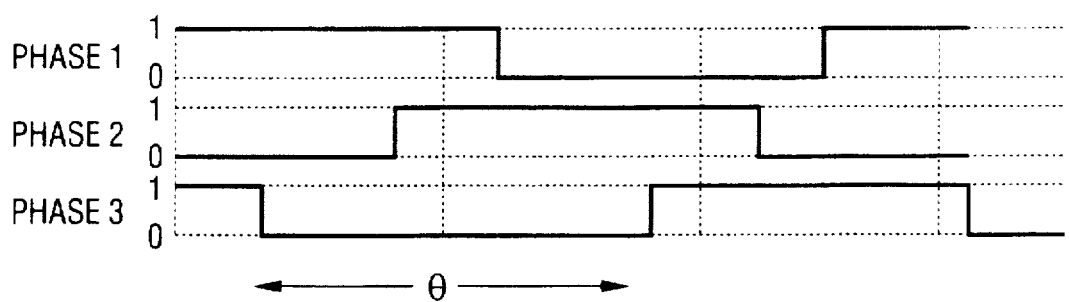
FIG. 4 shows Type I output waveforms.
Figure 5:
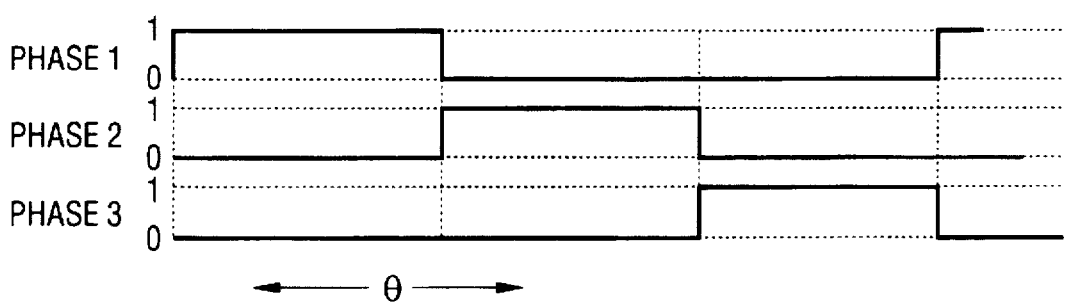
FIG. 5 shows Type II output waveforms.
Figure 6:
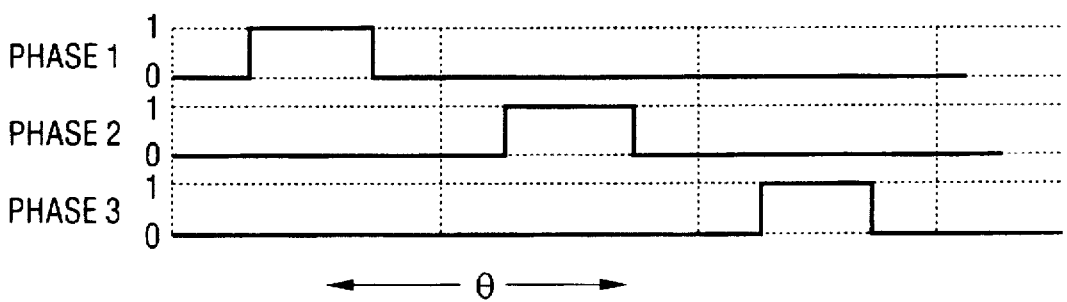
FIG. 6 shows Type III output waveforms.
Figure 9:
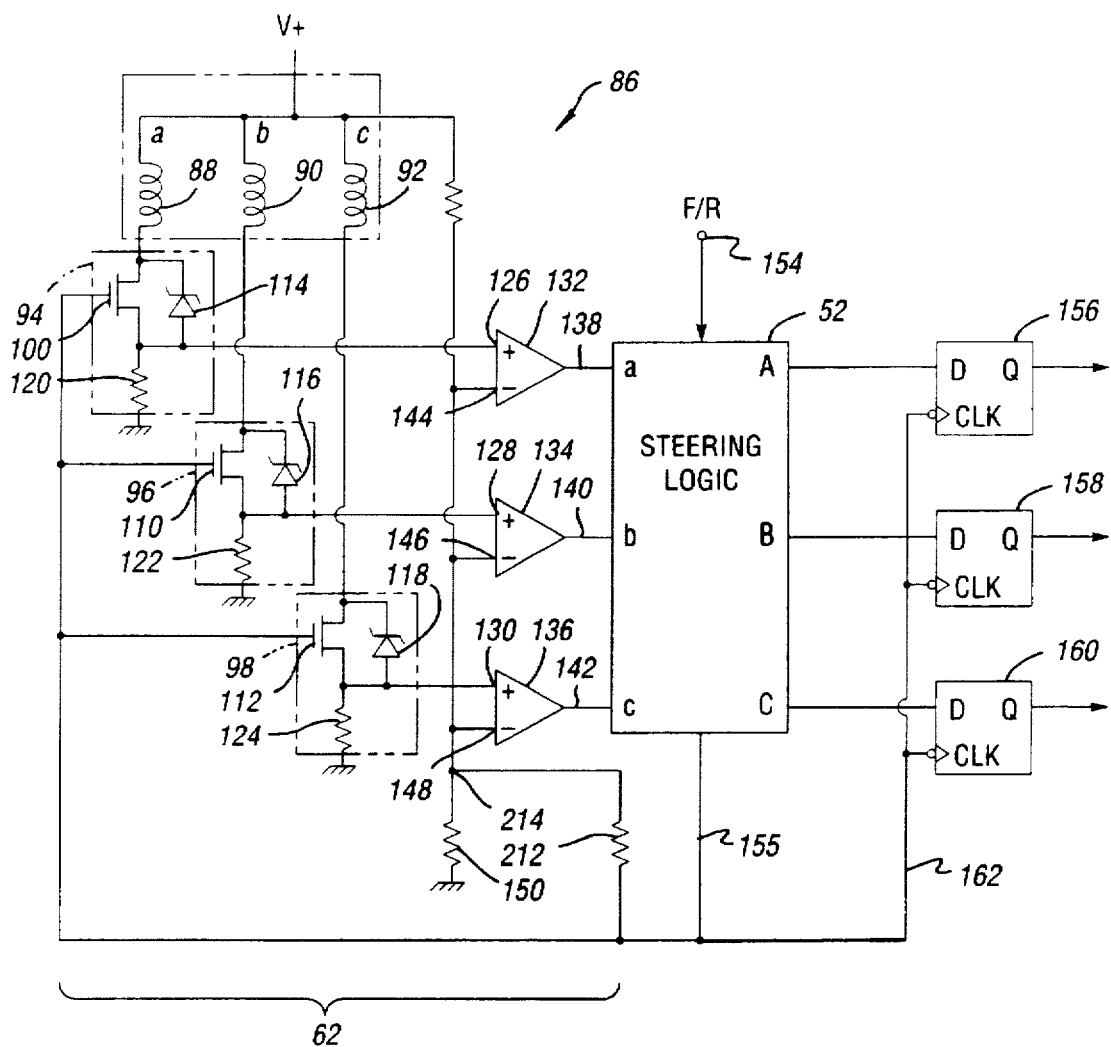
FIG. 9 is a circuit diagram of the excitation circuit of the present invention.

In a like manner, there are three types of commutator outputs from the encoder electronics as shown on FIGS. 4, 5 and 6. For a Type I commutator output, the three phase outputs from latches 156, 158 and 160 of the circuit diagram shown in FIG. 9 are spaced from its neighbor by 120°. Each phase is a logic 1 for half of the period, 180°, and a logic zero for the balance of the period. As a result, the output for each phase is overlapped by 60° by one or the other and the other two outputs as shown in FIG. 4. The Type I commutator output produces maximum motor torque.

For a Type II commutator output, the three outputs from the three latches 156, 158 and 160, are sequential and do not overlap, as shown in FIG. 5. Each output is spaced 120° from the other outputs and each output is a logic 1 for ⅓ of the period (120° electrical) and is a logic zero for the remainder of the period. The output of latches 156, 158 and 160 store the output of the steering logic as shown. The Type II commutator output works well for high speed operation.

Figure 11:
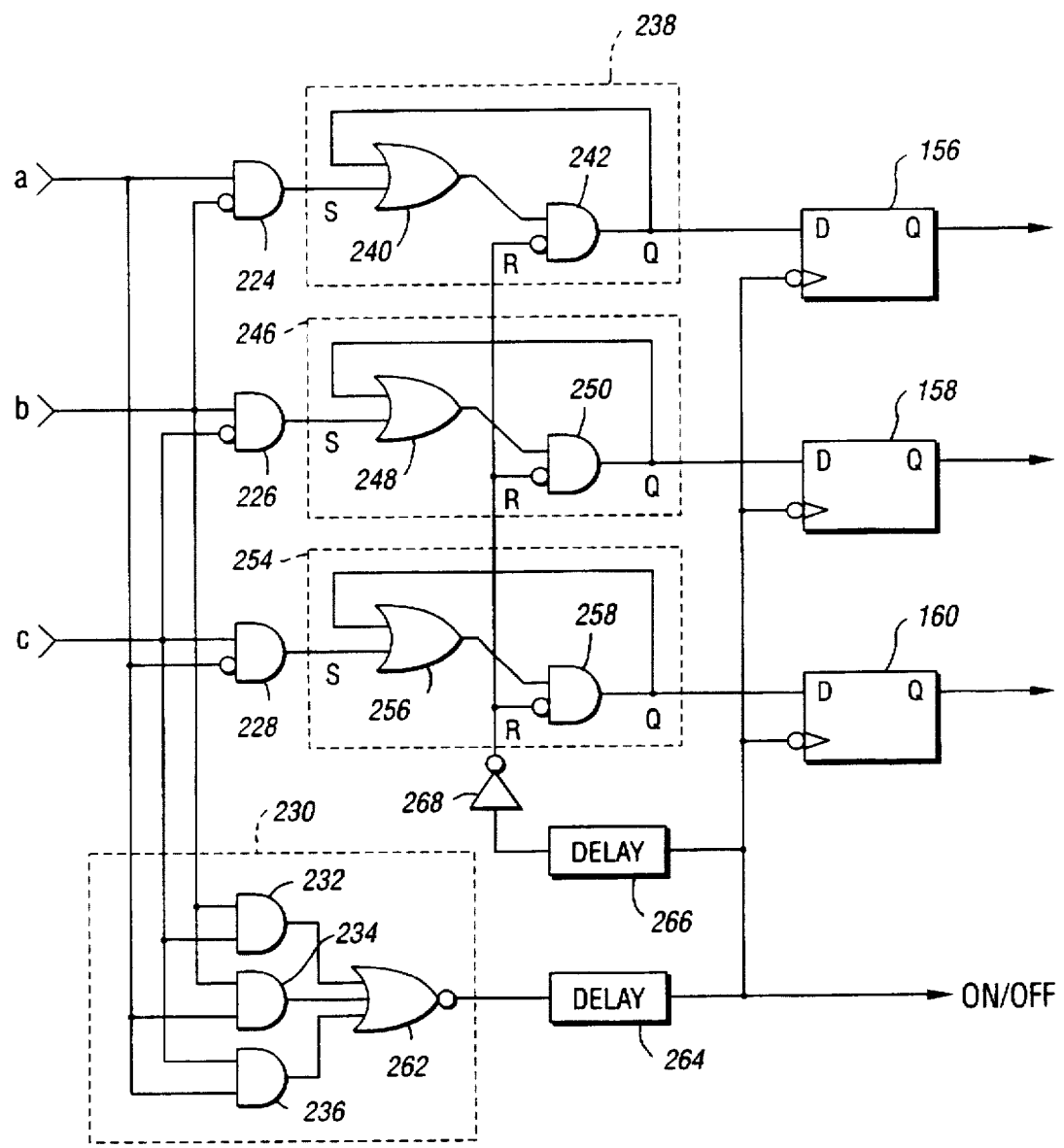
FIG. 11 is a second embodiment of the steering logic.

In a Type III commutator output, the three outputs from the latches 156, 158 and 160 are spaced apart as shown in FIG. 11. Each output is spaced electrically 120° from each other and each output is a logic 1 for ⅙ of the period (60° electrical) and is a logic zero for the remainder of the period. The Type III output is the most efficient of the three types of outputs but produces minimum torque.

Figure 7:
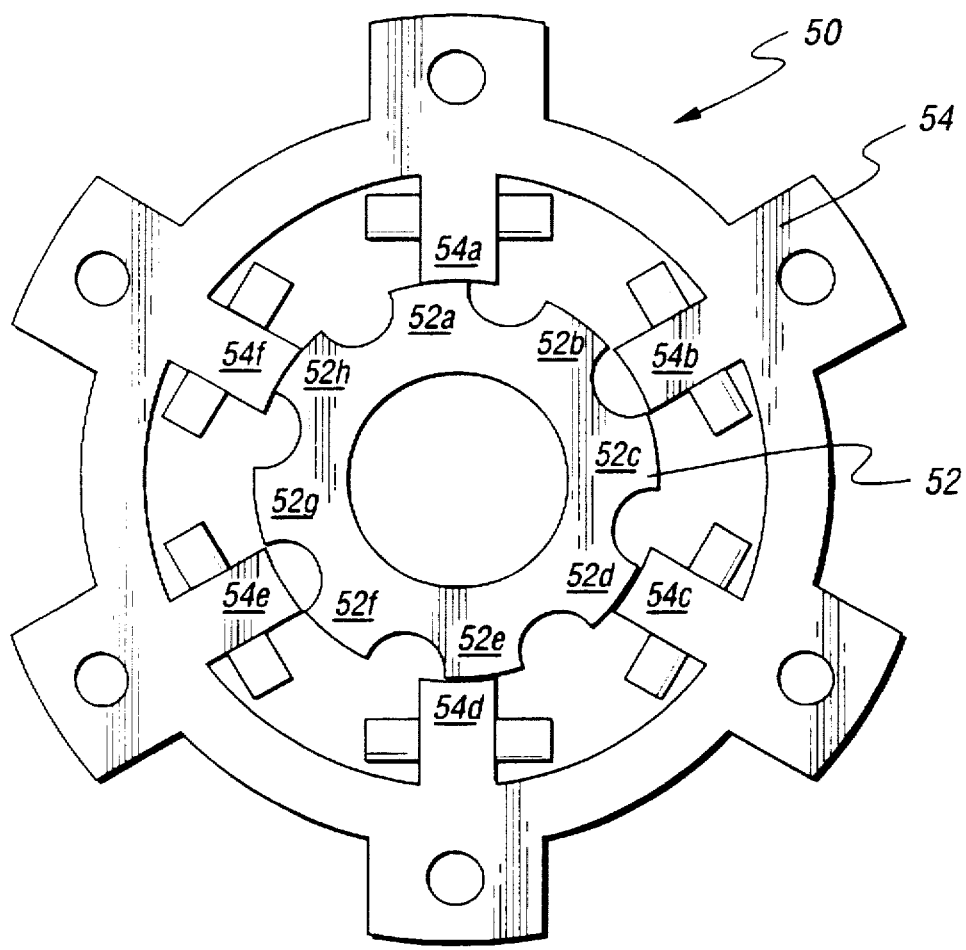
FIG. 7 is a plan view of the inductance sensor.

FIG. 7 is a plan view of an inductance sensor of the type used in accordance with the teachings of the present invention. The inductance sensor is designated generally by reference numeral 50. Sensor 50 consists of a magnetic salient pole rotating structure, i.e., a rotor 52, which is free to turn inside or outside of a stationary arrangement of stationary coils forming the stator 54. The number of poles in the rotor structure 52 is not the same as the number of poles in the stator structure 54. As a result, the combination produces a Vernier effect.

Typical rotor-stator pole combinations are 8–6, 4–6, 8–12, etc. Sensor 50 is particularly suited for use with a Variable Reluctance (VR) motor and may physically be placed on back of the VR motor and share the same rotor shaft 56, as shown in FIG. 8.

To enhance the magnetic detection of position and to reduce the detection currents, the stator coils may be wound around a salient pole magnetic structure, i.e., the stator core, as shown. In a preferred embodiment shown in FIG. 7, the rotor 52 is inside of the stator 54 and the stator has six salient poles 54a–54f, and the rotor has eight salient poles 52a–52h. Both the magnetic rotor 52 and the stator 54 are made of electrical steel to minimize eddy currents that might adversely affect the position detection. Typical means of obtaining this are through the use of thin steel laminations, i.e., nickel-steel alloys or other means to increase the magnetic material electric resistivity and reduce the hysteresis losses.

Figure 8:
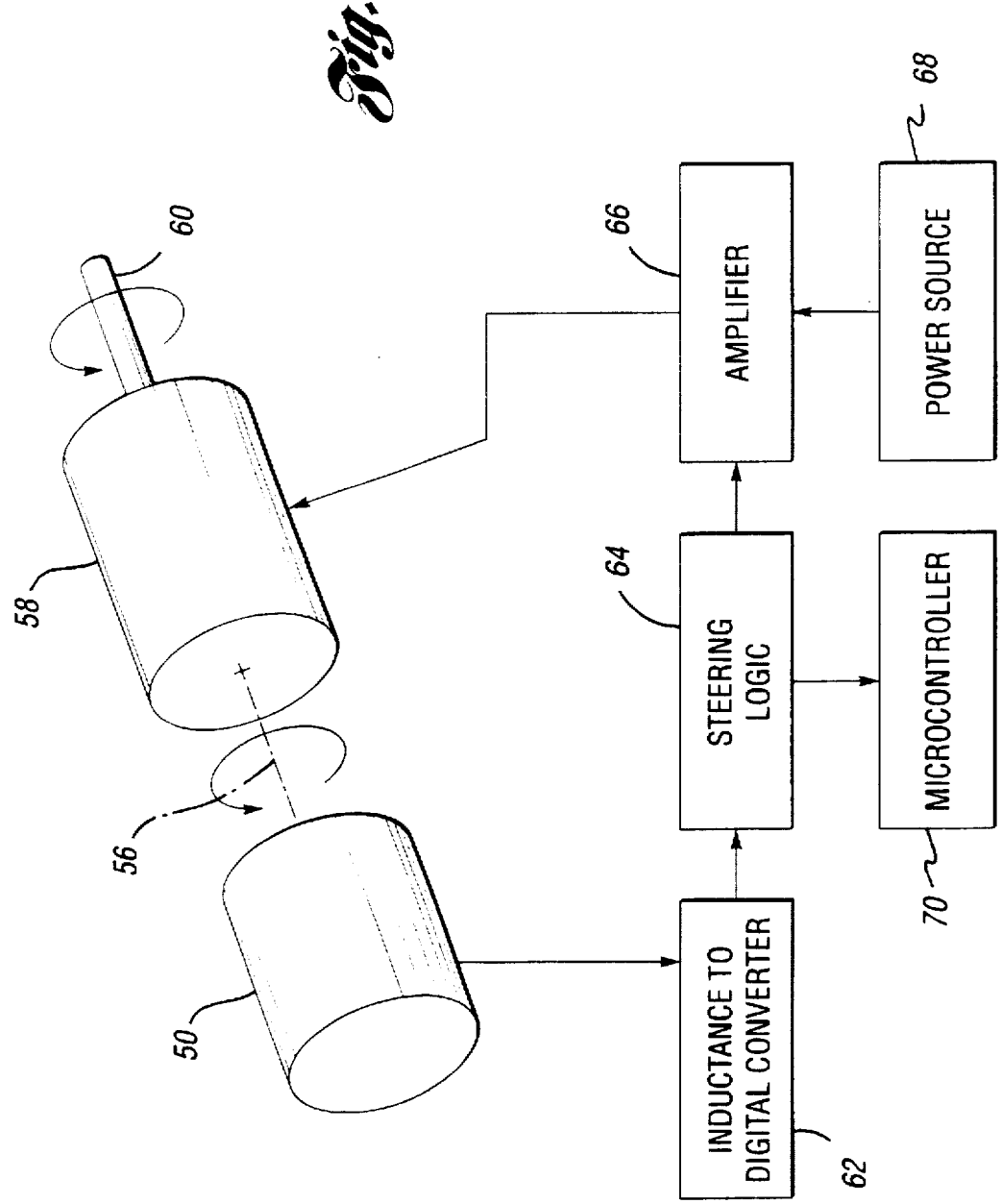
FIG. 8 is a schematic diagram of the encoder system of the present invention.

The schematic diagram of the preferred embodiment of the system of the present invention is shown in FIG. 8. As shown, encoder (position sensor) 50 is electrically and mechanically coupled and physically aligned with VR motor 58 and preferably, but not necessarily share the same rotor shaft 56. Motor 58 has an output shaft 60. Inductance to digital converter 62 is provided in electrical communication with encoder 50 as well as steering logic 64. An amplifier 66, in turn, is provided in electrical communication with VR motor 58, steering logic 64 and a power source 68.

The encoder system of the present invention is generally adapted to generate a signal having a value indicative of the phase (coil) of VR the motor 58 to apply current to so as to commutate motor 58. The system may, however, be adapted to also determine absolute rotor position. In this embodiment, a microcontroller 70 is provided to receive input from steering logic 64. In operation, microcontroller 70 generates a signal having a value indicative of the angular position of the rotor.

Preferably, the winding connection arrangement is three-phased windings with two coils connected in series in each phase. The self-inductance of each phase is related with the rotor position and the alignment of the encoder relative to the motor. As shown in FIGS. 1 through 3, the phase (inductance) of the encoder varies between a maximum crest when a rotor salient pole 52 is aligned with the stator coils, and a minimum valley when the rotor salient pole 52 is not under a stator coil. The mutual inductance between phases is also dependent on the rotor position.

In keeping with the invention, applicant recognizes that highly magnetic permeable materials in the rotor and stator cores will render larger values of the inductances. The width of the valleys and the crests in the inductance versus rotor position/motor torque profiles can, therefore, be controlled by adjusting the width and shape of the salient poles in the rotor 52 and stator 54. The optimum salient pole width combination for the rotor and stator poles provides the maximum inductance variation between crests and valleys. The optimum also produces crests and valleys of width close to zero and a linear variation of the inductance profile versus the rotor position/motor torque ranking in the region where the self-inductance of two adjacent phases has the same value.

To reduce the dependence and the effects of the mutual inductances between phases and to reduce the stator magnetization current, all windings and all phases are powered simultaneously, so the effects of mutual coupling between the phases are balanced out. In this manner, the magnetic path is also the shortest given the small stator currents.

It is, of course, desirable to obtain the larger possible value of the variable inductance. This can be obtained by increasing the number of turns in the stator coils, or by using highly permeable materials, or by reducing the air gap between the rotor and stator or, still further, by increasing the cross-sectional area of the poles or, yet still further, by using the combination of all of the above approaches. Of course, the obvious limitation of size and manufacturing costs will set the limits of these variables.

Referring again to FIG. 1, the inductance profile of the position sensor 50 of the present invention is shown. Like the motor torque profile, the inductance profile of the encoder spans 45 mechanical degrees (zones $Z_1$–$Z_6$) and comprises three phase-separated, pseudo-sinusoidal waveforms $E\emptyset_a(10)$, $E\emptyset_b(12)$, and $E\emptyset_c(14)$. The relationship between the inductance profile of the encoder 50 and the motor torque profile of the three-phase motor is apparent. In zone $Z_1$, for example, $E\emptyset_a(10)$ of the inductance sensor 50 has the highest inductance. In this same zone, $E\emptyset_b(12)$ has the lowest inductance and $E\emptyset_c(14)$ has a mid-value inductance.

As previously discussed, for the low-speed operation scenario of FIG. 1, the inductance profile tracks the motor torque profile. In each zone, positive motor torque corresponds to the encoder phase with the maximum inductance. Similarly, negative motor torque corresponds to the encoder phase with the minimum inductance.

The details of the inductance to digital converter 62 in accordance with the invention are shown in FIG. 9. The inductance to digital converter 62 is used to convert the changing encoder inductance values to digital values and the steering logic 64 generates an output signal having a value corresponding to the phase of the motor to apply current to so as to commutate the motor. The inductance to digital converter 62 is connected to the encoder coils 88, 90 and 92, of the encoder 50. Encoder coils 88, 90 and 92 are each provided in electrical communication with a corresponding switches designated generally by reference numerals 94, 96 and 98. In the preferred embodiment, each of these switches constitutes a power MOSFET 100, 110 and 112, a transient suppressor such as zenor diode 114, 116 and 118, and a current to voltage converter element such as resistor 120, 122 and 124.

Each of the switches 94, 96 and 98 provides an input 126, 128 and 130 to a corresponding comparator 132, 134 and 136. The outputs of the comparators 138, 140, and 142 change to a logic 1 when the current in their respective variable reluctance coils reach a predetermined level as set by variable voltage source 150 to the inverting inputs 144, 146 and 148 of comparators 126, 128 and 130. Steering logic 64 includes a forward/reverse input 154, an end of cycle output 155 and provides outputs A, B and C to respective latches such as D-type flip-flops 156, 158 and 160. The outputs of latches 156, 158 and 160 are coupled to the amplifier 66, as shown in FIG. 8, and signify which of the motor coils should be powered so as to commutate the VR motor 58.

In operation, the inductance to digital converter 62, and in particular, comparators 132, 134, and 136 determine which of the encoder coils 88, 90 or 92 has a low, middle or high value by the order in which they cycle. The inductance/rotor position relationships shown in FIGS. 1 through 3 thus provide the means to determine which phase of the motor to apply current to so as to control the motor as desired.

If negative motor torque is desired, the forward/reverse input is switched from a logic 0 to a logic 1 and the curves of FIGS. 1 through 3 provides the information to power the motor to run in a reverse direction.

Whichever comparator is first to toggle, i.e., its input voltage exceeds the reference voltage, is the comparator associated with the coil having the minimum inductance. This is true because it is known that the lower the inductance, the faster the current rises. In contrast, the greater the inductance of the coil the slower the current rises. Armed with this information, means may be provided for making this decision. The steering logic of FIGS. 10 through 15 provides this logic.

Figure 10:
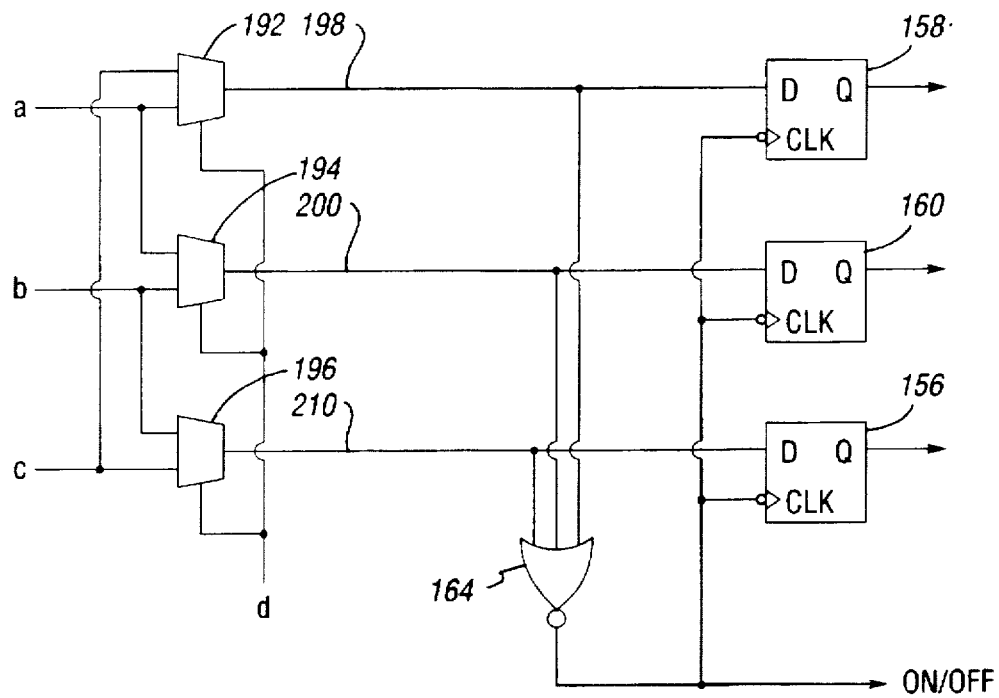
FIG. 10 is a first embodiment of the steering logic.

Steering logic for high-speed motor operation is shown in more detail in FIG. 10. This type of steering logic is used with a Type III alignment as shown in FIG. 3 and a Type II commutator output shown in FIG. 5. This steering logic includes a plurality of multiplexers 192, 194 and 196 each of which receives an input, a, b and c, respectively, from a corresponding comparator 132, 134 and 136 and has a corresponding output 198 to D latch 158, 200 to D latch 160 and 210 to D latch 156 for input to respective latches 158, 160 and 156. NOR gate 164 receives inputs from multiplexers 192, 194 and 196 and produces an output in response to any one of the D-type flip-flops 156, 158 or 160 receiving a logic 1 input. The output of NOR gate 164 is an end of cycle signal which clocks the D-type flip-flops 156, 158 and 160 to store the signal output by its associated multiplexer. This steering logic may be expressed by the following Boolean equation:

$$A = (c \cdot \bar{d}) + b \cdot d$$

$$B = (a \cdot \bar{d}) + c \cdot d$$

$$C = (b \cdot \bar{d}) + a \cdot d$$

where A is the value stored in D latch 156, B is the value stored in D latch 158 and C is the value stored in D latch 160. The forward/reverse input d=1 for reverse operation (negative motor torque) and d=0 for forward operation (positive motor torque), and $\bar{d}$ is the logical inverse of d.

The operation of the steering logic referenced above may be more fully understood by reference to the following example. Consider a situation where in zone $Z_1$, of FIG. 3, there is a moment in time where the output of NOR gate 164 switched from a zero to a logic 1 state. At that instant in time, the current in the encoder coils 88, 90 and 92 begins to increase. As shown in FIG. 3 of the drawings, $E\emptyset_a$ in zone $Z_1$ has the maximum inductance. Thus, the current will rise the slowest on that particular phase. $E\emptyset_b$ in zone $Z_1$ has the least amount of inductance. In operation, the voltage presented to the non-inverting input 128 of comparator 134 in zone $Z_1$, reaches the reference voltage first. It therefore switches to a logic 1. The "b" input to steering logic 64 is thus presented with a logic 1. Because the focus is on positive torque, the "d" input 154 is a logic zero, therefore a logic 1 is presented at the input to D-type flip-flop 160 and to the input of NOR gate 164.

The NOR gate 164 then produces a logic 0 output which clocks the D-type flip-flops 156, 158 and 160 to store the outputs of comparators 132, 134, and 136. Since only comparator 134 has a logic 1 output, only D-type flip-flop 160 will store a logic 1. D-type flip-flops 156 and 158 will store logic 0's. The logic 0 output of NOR gate 164 on line 155 will also turn off switches 94, 96 and 98 causing the voltages at the inputs to comparator 132, 134 and 136 to decay. When the voltage at the non-inverting input to comparator 134 decays to a value less than the voltage applied to its inverting input, the output of comparator 134 switches back to a logic 0 and the output of NOR gate 164 switches back to a logic 1 and the cycle repeats.

Returning to the Boolean equation, it can be seen that the only equation which meets the condition for a logic 1 in zone $Z_1$ is the input 200 to latch 160. This is true because the inputs 198 and 210 to latches 158 and 158, respectively, are blocked out at zeros because comparator 132 and 136 have not been switched to a logic 1 yet. The second term of the Boolean equations are zero due to the zero value of "d" on select line 154 for forward operation (positive motor torque).

The steering logic functionality is, of course, dynamic in that it changes instantaneously in time. Thus, at the instant that comparator 136 produces a logic 1 output, the Boolean equation for the state of latch 156 is satisfied. Output 210 ("A") thus becomes a logic 1 and outputs 198 ("B") and 200 ("C") for an instant in time remain zero.

When output 210 ("A") changes to a logic 1, gate 164 seeing a logic 1 at its input, changes its output to zero. The zero output of gate 164 turns off switches 94, 96 and 98 thereby terminating the rising current flow in the encoder coils 88, 90 and 92. In accordance with the invention, comparator associated with the encoder coil having the largest inductance never sees a logic 1. When the output of gate 164 becomes a logic zero, the latches 156, 158 and 160 are clocked and output 210 ("A") having a logic 1 is stored in latch 156 while outputs 198 and 200 which are at a logic zero are stored in latches 158 and 160, respectively. These values are saved. When the output of gate 164 changes to a logic zero, the reference value for comparators 132, 134 and 136 is again lowered to a lower threshold through resistor 212 which pulls down the reference node 214. This time, it is irrelevant if any of the comparators 132, 134 or 136 change state because their values had been previously stored in the latches. Thereafter, all the currents in the coils 88, 90 and 92 again decay.

As soon as outputs of comparators 132, 134 and 136 change back to zero because of the turning off of the FETS 94, 96 and 98, then the cycle repeats itself all over again. This is true because when outputs 198, 200, and 210 are zero, the output of gate 164 becomes a logic 1 and the process repeats itself.

The steering logic circuit for producing a Type I commutator output with a Type II alignment is shown in FIG. 11. The inputs a, b, and c, from comparators 132, 134 and 136 respectively, are received at one of the inputs to NAND gates 224, 226 and 228 respectively. The input a is also connected to a negative input of NAND gate 228 and to the inputs of AND gates 234 and 236 of a cycle compete logic circuit 230. Input b is also connected to a negative input to NAND gate 224 and to an input of AND gates 232 and 234 of the cycle complete logic circuit 230 and input c is also connected to the negative input to NAND gate 226 and to the inputs to AND gates 232 and 236.

The output of NAND gate 224 is connected to the set input to a set/reset latch 238 consisting of OR gate 240 and NAND gate 242. The Q output of the set/reset latch 238 is connected to the D input to latch 156. In a like manner, the output of NAND gate 226 is connected to the set input to set/reset latch 246 consisting of OR gate 248 and NAND gate 250. The Q output of the set/reset latch 246 is connected to the D input to latch 158. In a similar manner, the output of NAND gate 228 is connected to the set input of set/reset latch 254 consisting of OR gate 256 and NAND gate 258 and the output of set/reset latch 254 is connected to the D input to latch 160.

The outputs of AND gates 232, 234 and 236 of the cycle compile logic circuit 230 are connected to the inputs to NOR gate 262. The output of NOR gate 262 is connected to the clock inputs to latches 156, 158, and 160 through a first delay circuit 264. The output of delay circuit 264 is also connected to the reset (R) inputs to set/reset latches 238, 246 and 254 through a second delay circuit 266 and an inverter 268.

The operation of this circuit is as follows:

The output of latch 156 is a logic 1 in zones $Z_4$, $Z_5$, and $Z_6$ of FIG. 2 in response to the input a from comparator 132 being a logic 1 prior to the input b from comparator 134 being a logic 1. The output of latch 158 is a logic 1 in zones $Z_5$, $Z_6$ and $Z_1$ in response to the input b from comparator 134 being a logic 1 prior to the input c from comparator 136 being a logic 1 and the output of latch 160 is a logic 1 in zones $Z_1$, $Z_2$ and $Z_3$ in response to the input c from comparator 136 being a logic 1 prior to the input a from comparator 132 being a logic 1.

The cycle complete logic 230 inhibits the clocking of the latches 156, 158 and 160 until two of the three inputs a, b, or c, are a logic 1. Upon the occurrence of two of the inputs a, b or c, the latches 156, 158 and 160 are clocked by the output of the cycle complete logic circuit 230 and store the value stored in their associated set/reset latch. The set/reset latches are then reset by the output of inverter 268.

The logic 0 output of the delay circuit 264 is also applied to the gates of the switches 94, 96 and 98 shown on FIG. 9 which causes the output a, b, and c of comparators 132, 134 and 136 to decay. When at least two of the inputs a, b, and c return to zero, the output of the cycle compete logic 230 returns to a logic 1 and the cycle repeats.

Figure 12:
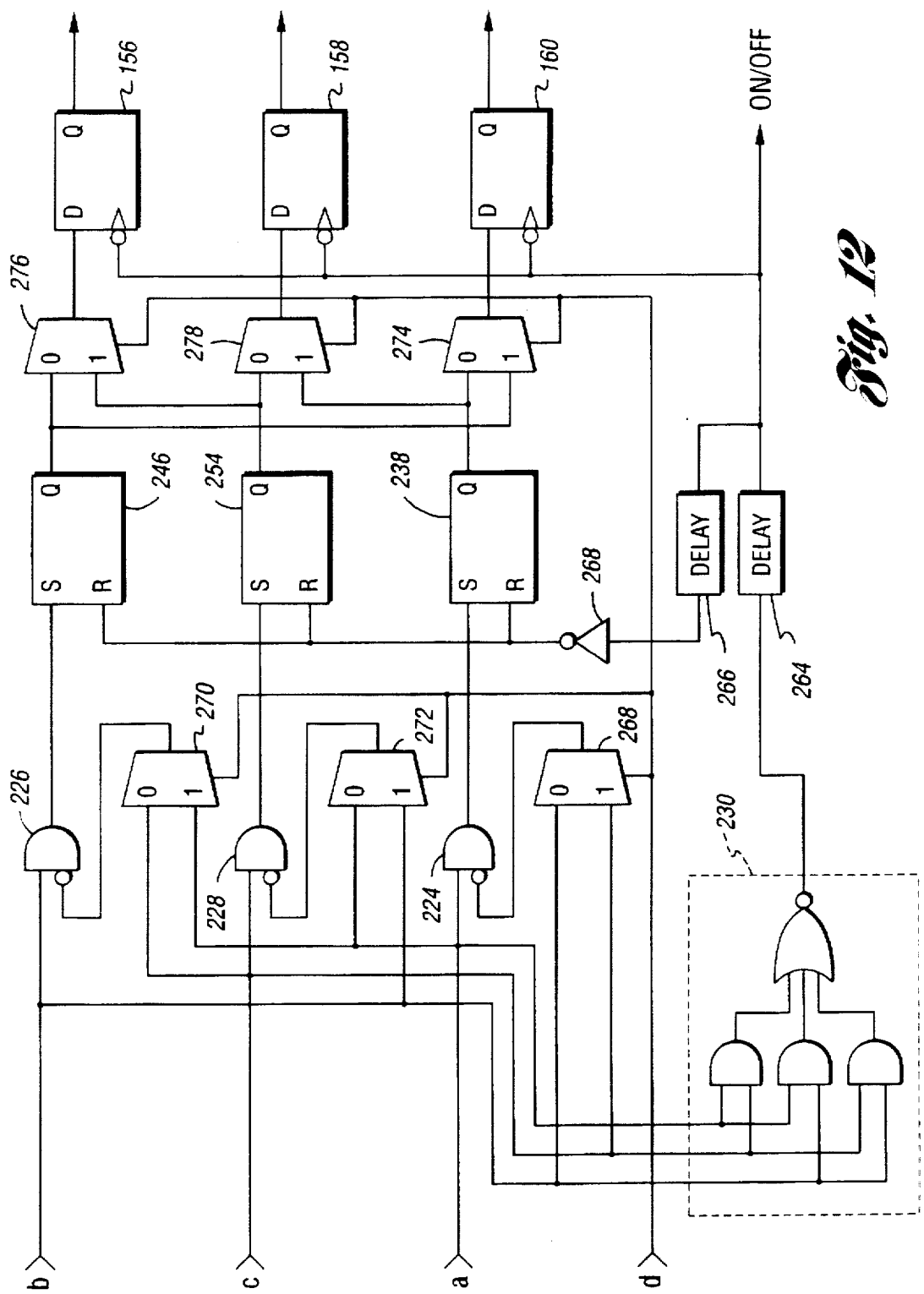
FIG. 12 is a circuit diagram of a third embodiment of the steering logic.

FIG. 12 shows a bi-directional embodiment of the steering logic of FIG. 11 embodying multiplexers permitting the switching between both positive and negative motor torques. The circuit components shown on FIG. 12 have the same reference numerals as shown on FIG. 11. Multiplexer 268 alternatively connects the negative input of NAND gate 224 to the "b" input for forward motor torque or to the "c" input for negative motor torque. Likewise multiplexer 270 connects the negative input of NAND gate 226 to the "c" input for positive torque or to the "a" input for negative motor torque. Multiplexer 272 connects the negative input of NAND gate 228 to the "a" input for positive motor torque and to the "b" input for negative motor torque.

Multiplexer 274 connects the output of set/reset latch 238 to the D input of latch 160 for positive motor torque or connects the output of set/reset latch 246 to the D input to latch 160 for negative motor torque. In a like manner, multiplexer 276 connects the output of set/reset latch 246 to the input to latch 156 for positive motor torque and output of set/reset latch 254 to the input to latch 156 for negative motor torque. Also multiplexer 278 connects the output of set/reset latch 254 to the D input of latch 158 for positive motor torque or connects the output of set/reset latch 238 to the D input of latch 158 for negative motor torque.

The multiplexers 270 through 278 are connected to the d input which has a zero value for positive motor torque and a logic 1 value for negative motor torque. For positive motor torque, i.e., d=0, the state of latch 156 is a logic 1 for $E\phi_a > E\phi_b$, the state of latch 158 is a logic 1 for $E\phi_a > E\phi_c$ and the state of latch 160 is a logic 1 for $E\phi_b > E\phi_a$. For negative motor torque, i.e. d=1 the state of latch 156 is a logic 1 for $E\phi_c < E\phi_b$, the state of latch 158 is a logic 1 for $E\phi_a < E\phi_c$ and the state of latch 160 is a logic 1 for $E\phi_b < E\phi_a$.

Figure 13:
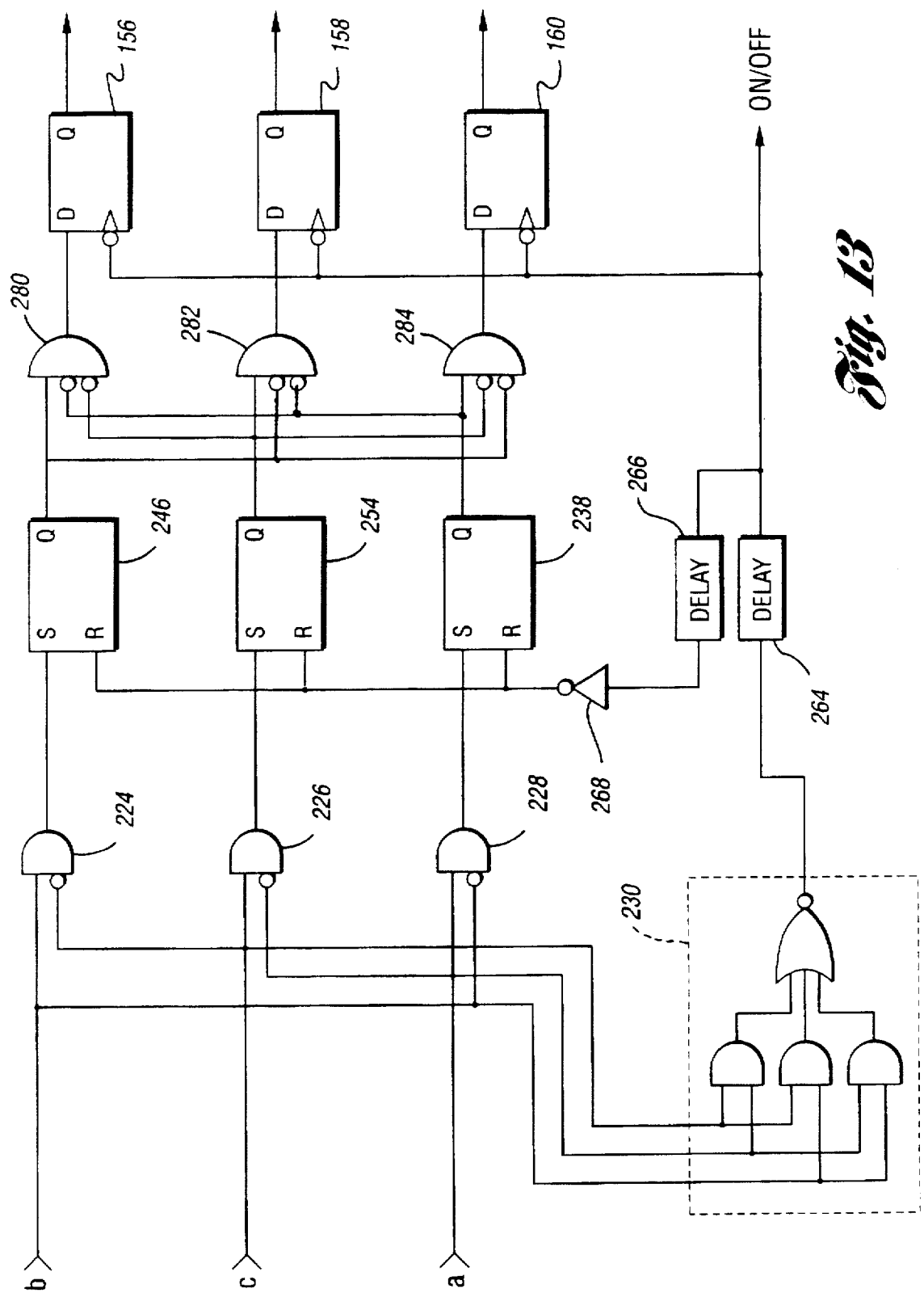
FIG. 13 is a circuit diagram of a fourth embodiment of the steering logic.

FIG. 13 shows an unidirectional steering logic for a Type III commutator output with a Type II alignment. This circuit is substantially the same as the circuit shown of FIG. 11 with the exception that NAND gates 280, 282 and 284 are interposed between the outputs of set/reset latches 246, 254, and 238 and the D input of their associated latches 156, 158 and 160, respectively. The output of set/reset latches 238 is connected to the positive input to NAND gate 284 and to the negative inputs to NAND gates 280 and 282. The output of set/reset latch 246 is connected to a positive input to NAND gate 280 and to the negative inputs to NAND gates 282 and 284. Likewise, the output of set/reset latch 254 is connected to the positive input to NAND gate 282 and to the negative inputs of NAND gates 280 and 284.

In operation, the output NAND gate 280 is a logic 1 when input b is received prior to input a and input a is received prior to input c. This occurs in zone $Z_6$ of FIG. 2. Likewise the output of NAND gate 158 is a logic 1 when input c occurs before input a and input a occurs before input c which occurs in zone $Z_2$ shown in FIG. 2. Finally, the output of NAND gate 160 is a logic 1 when input a occurs before input c and input c occurs before input b, which occurs in zone $Z_4$ of FIG. 2. At all other times, the outputs of latches 156, 158 and 160 are zero.

Figure 14:
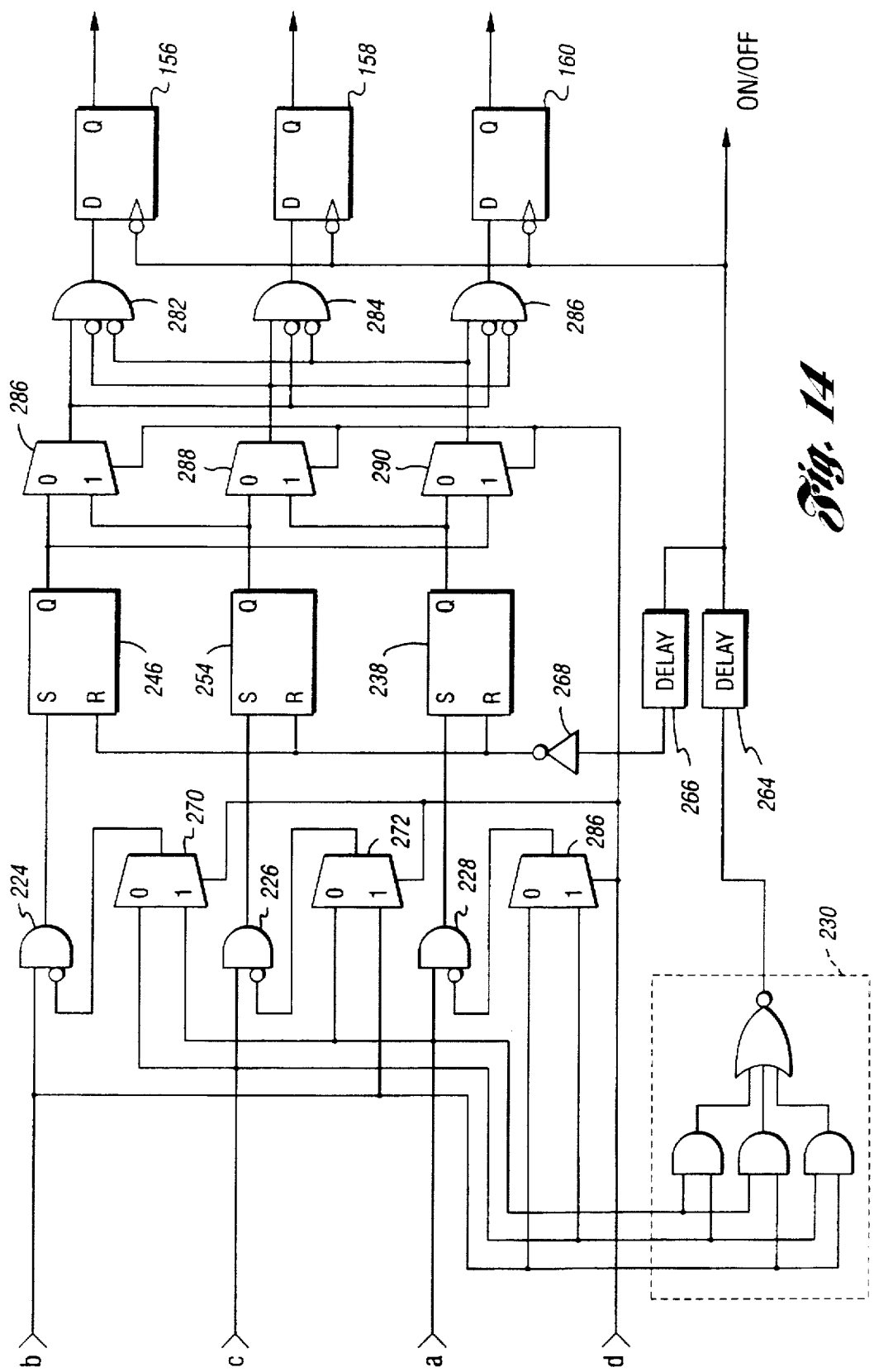
FIG. 14 is a circuit diagram of a fifth embodiment of the steering logic.

The equivalent bi-direction circuit of the circuit shown in FIG. 13 is shown in FIG. 14. In a manner similar to that discussed relative to FIG. 11, multiplexers 270, 272 and 274 are interposed between the negative input to the NAND gates 224, 226 and 228 and the respective inputs 1, b, and c as shown. The multiplexers 286, 288 and 290 are interposed between the outputs of set/reset latches 238, 246 and 254 and the input to the respective associated NAND gates 282, 284 and 286, to switch the positive input to NAND gate 286 between set/reset latch 238 for positive motor torque and set/reset latch 24654 for negative motor torque, to switch the positive input to NAND gate 2842 between set/reset latch 254 for positive motor torque and to set/reset latch 238 for negative motor torque, and to switch the positive input to NAND gate 282 from set/reset latch 246 for positive motor torque to set/reset latch 254 for negative motor torque. The multiplexers are controlled in response to the "d" input having a logic zero for positive motor torque and a logic 1 for negative motor torque.

Figure 15:
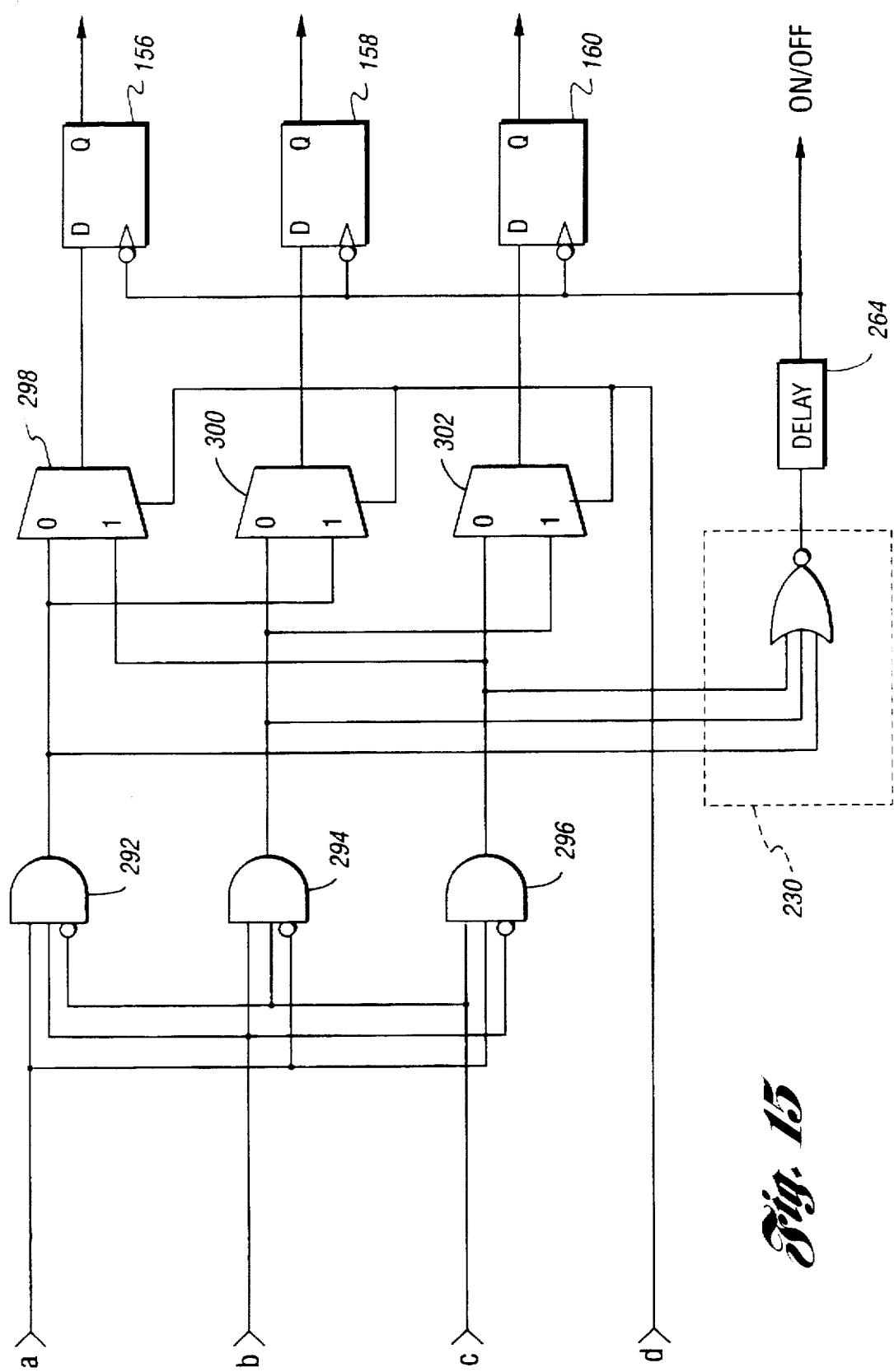
FIG. 15 is a circuit diagram of a sixth embodiment of the steering logic.

An embodiment of the steering logic for a Type II commutator output with a Type I alignment is shown in FIG. 15. Inputs "a" and "b" are received at the positive inputs to NAND gate 292 and input "c" is received at the negative input to NAND gate 292. Likewise, inputs "b" and "c" are received at the positive inputs to NAND gate 294 and the "a" input is received at the negative input to NAND gate 294. Further inputs "c" and "a" are received at the positive inputs to NAND gate 296 while input "b" is received at the negative input to NAND gate 296. The output of NAND gate 292 is connected to a first input of multiplexer 298, a second input of multiplexer 300 and to the cycle complete logic 230. The output of NAND gate 294 is connected to the first input of multiplexer 300, the second input to multiplexer 302, and to the cycle complete logic 230. Likewise, the output of NAND gate 296 is connected to a first input to multiplexer 302, a second input to multiplexer 298, and to the cycle complete logic 230. The output of multiplexer 298 is connected to the D input to latch 156, the output of multiplexer 300 is connected to the D input of latch 158 and the output of multiplexer 302 is connected to the D input of latch 160. The multiplexers 156, 158 and 160 are controlled by the "d" input which is logic zero for positive motor torque and a logic 1 for negative motor torque.

The output of NAND gate 292 is a logic 1 when inputs "a" and "b" are a logic 1 and input "c" is zero which occurs in zone $Z_5$ and $Z_6$ of FIG. 1, the output of NAND gate 294 is a logic 1 when inputs "b" and "c" are logic 1 and input "a" is a logic zero which occurs in zones $Z_1$ and $Z_2$, and the output of NAND gate 296 is a logic 1 when inputs "a" and "c" are logic 1 and input "b" is a logic zero which occurs in zones $Z_3$ and $Z_4$. The output of the cycle complete logic 230 becomes a logic zero when one of the 3 NAND gates 292, 294 or 296 is a logic 1. For positive torque, latch 156 is a logic 1 when the output of NAND gate 292 is a logic 1, latch 158 is a logic 1 when the output of NAND gate 294 is a logic 1, and latch 160 is a logic 1 when the output of NAND gate 298 is a logic 1, latch 158 is a logic 1 when the output of NAND gate 192 is a logic 1 and latch 160 is a logic 1 when the output of NAND gate 294 is a logic 1.

The logic zero output of the cycle complete logic 230 will clock the latches 156, 158, and 160 to store the output of the associated multiplexers. The multiplexers 298, 300 and 302 will switch the latch storing the logic 1 output of NAND gates 292, 294 or 296 as is known in the art.

Figure 16:
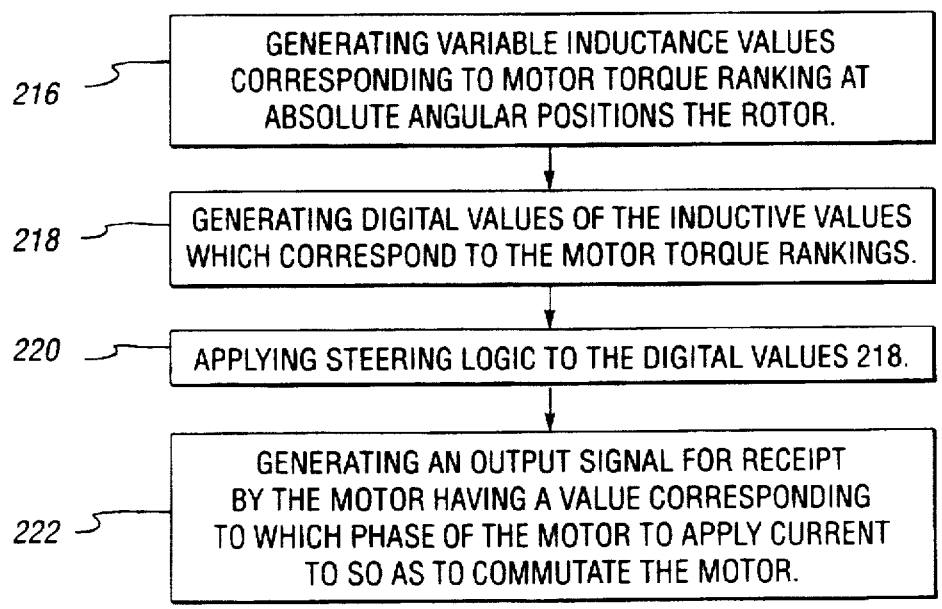
FIG. 16 is a flow diagram of the method for exciting a three-phase variable reluctance motor.

Turning now to FIG. 16 of the drawings, the method of the present invention may be more particularly described. The described method may be used to commutate a three-phase VR motor with any of the three commutator outputs shown in FIGS. 4, 5, and 6. The method includes generating variable inductance values corresponding to motor torque rankings at absolute angular positions of the rotor as indicated by block 216. Once the variable inductance values have been generated, digital values are generated of the inductance values which correspond to the motor torque rankings as indicated by block 218. Subsequently, applying steering logic to the digital values as indicated by block 220, an output signal may be generated for receipt by the motor as indicated by block 222. The generated output signal has a value corresponding to which phase of the motor to apply current to so as to commutate the motor.

While various methods for carrying out the invention has been described in detail, those familiar with the art to which this invention relates will recognize various alternative designs and embodiments for practicing the invention as defined by the following claims.

What is claimed is:

1. A system for commutating a three-phase variable reluctance motor comprising:

a power source;

a position sensor adapted to generate a plurality of variable inductance values corresponding to relative motor torque rankings at absolute angular positions of the motor;

an inductance to digital converter in electrical communication with said position sensor and said power source for generating a sequence of digital values from said inductance values, said sequence of digital values indicating which phase of the motor to apply electrical power to so as to commutate the motor to provide optimum torque; and steering logic responsive to said sequence of digital values to generate output signals having values corresponding to the phase of the motor indicated, wherein said steering logic includes means responsive to an externally generated signal to commutate said motor, in the alternative, to produce a positive motor torque and a negative motor torque.

2. The system of claim 1 wherein said output signals generated by said steering logic are Type I commutation signals in which the output signals for the phases of the motor overlap.

3. The system of claim 2 wherein said inductance to digital values converter produces three input signals, one for each phase of the motor and wherein said steering logic comprises:

a first NAND gate for producing a first logic 1 output in response to a first input signal of said three input signals and the absence of a second input signal of said three input signals;

a second NAND gate for producing a second logic 1 output in response to said second input signal and an absence of a third input signal of said three input signals;

a third NAND gate for producing a third logic 1 output in response to said third input signal and the absence of said first input signal;

a first set/reset latch for temporarily storing the value of said first NAND gate;

a second set/reset latch for temporally storing the value of said second NAND gate;

a third set/reset latch for temporarily storing the value of said third NAND gate;

a first latch for storing the value stored in said first set/reset latch;

a second latch for storing the value stored in said second set/reset latch;

a third latch for storing the value stored in said third set/reset latch; and cycle complete logic responsive to at least two of said three input signals to clock said first, second, and third latches to store the content of said first, second and third set/reset latches, to reset said first second and third set/reset latches and to reset said inductance to digital converter.

4. The system of claim 3 wherein said values stored in said first, second and third latches commutate said motor to produce a positive motor torque, said steering logic further includes means for switching the values stored in said first, second and third latches to commutate said motor to produce a negative motor torque.

5. The system of claim 1 wherein said output signals generated by said steering logic are Type II outputs in which the output signals are spaced at 120° from each other and each output signal has a logic 1 value for ⅓ of a period.

6. The system of claim 5, wherein said inductance to digital converter produces three input signals, one for each phase of the motor and wherein said steering logic comprises:

a first AND gate for producing a first logic 1 output in response to said first input signal and said third input signal;

a second AND gate for producing a second logic 1 output signal in response to said second input signal and said first input signal;

a third AND gate for producing a third logic 1 signal in response to said third input signal and said second input signal;

a first latch for storing the output of said first AND gate;

a second latch for storing the output of said second AND gate;

a third latch for storing the output of said third AND gate; and end of cycle logic responsive to at least one of said AND gates generating a logic 1 output to clock said first, second and third latches to store the output of its associated AND gate and to reset said inductance to digital converter.

7. The system of claim 6 wherein said output stored in said first, second and third latches commutate said motor to produce a positive motor torque, said steering logic further includes means for switching the outputs stored in said first, second and third latches to commutate said motor to produce a negative motor torque.

8. The system of claim 1 wherein said output signals generated by said steering logic are Type III outputs in which the individual output signals are spaced 120° from each other and each output signal has a logic 1 value for ⅙ of a period.

9. The system of claim 8 wherein said inductance to digital converter produces three input signals, one for each phase of the motor and wherein said steering logic comprises:

a first NAND gate producing a logic 1 output in response to a first of said three input signals and the absence of a second of said three input signals;

a second NAND gate producing a logic 1 output in response to said second of said three input signals and the absence of a third of said three input signals;

a third NAND gate producing a logic 1 output in response to said third of said three input signals and the absence of said first of said three input signals;

three set/reset latches for respectively storing the outputs of said first second and third NAND gates;

a fourth gate for producing a logic 1 output in response to a logic 1 being stored in a first set/reset latch and a logic 0 being stored in the second and third set/reset latches;

a fifth gate for producing a logic/output in response to a logic 1 being stored in said second set/reset latch and a logic 0 being stored in said first and third set/reset latches;

a sixth gate for producing a logic 1 output in response to a logic 1 being stored in said third set/reset latch and a logic 0 being stored in said first and second set/reset latches;

three latches for storing respectively the output of said fourth, fifth and sixth gates;

an end of cycle logic for generating an output signal in response to at least two of sid three inputs to clock said first, second and third latches to store respectively the outputs of said fourth, fifth and sixth gates, to reset said first, second and third set/reset latches, and to reset said inductance-to-digital converter to generate new first, second and third input signals.

10. The system of claim 9 wherein said output stored in said first, second and third latches commutate the motor to produce a positive motor torque, said steering logic further includes means for switching the outputs stored in said first, second and third latches to commutate said motor to produce a negative motor torque.

11. A method for commutating a three phase variable reluctance motor comprising:

generating, with an inductance sensor, phase separated, pseudo-sinusoidal waveforms corresponding to inductance values and relative motor torque rankings at absolute angular positions of a rotor of the variable reluctance motor;

converting said inductance values to a sequence of corresponding digital values, said sequence of digital values indicating which phase of the motor to apply electrical power to so as to commutate the motor to provide optimum torque; and generating, in response to said sequence of digital values, output signals having values corresponding to the phase of the motor indicated.

12. The method of claim 11 wherein said step of generating output signals further includes the steps of:

generating a direction signal having a first value causing said step of generating output signals to generate output signals having values indicative of which phase of the motor to apply electrical power to produce a positive motor torque and switchable to a second value causing said step of generating output signals to generate output signals having values indicative of which phase of the motor to apply electrical power to produce a negative motor torque.

13. The method of claim 12 wherein said step of generating output signals generates Type I output signals equally spaced from each other by 120° and having a logic 1 value for half the period of the motor.

14. The method of claim 12 wherein said step of generating output signals generates Type II output signals equally spaced from each other by 120° and having a logic 1 value for ⅓ of the period of the motor.

15. The method of claim 12 wherein said step of generating output signals generates Type III output signals equally spaced from each other by 120° and having a logic 1 value for ⅙ of the period of the motor.

* * * * *